(12) United States Patent
Schmeisser et al.

(10) Patent No.: US 7,859,853 B2
(45) Date of Patent: Dec. 28, 2010

(54) HAND-HELD DIAGNOSTIC DISPLAY UNIT INCLUDING COMBINATION FOLDING STAND AND HANGER ASSEMBLY

(75) Inventors: Gordon F. Schmeisser, Santa Cruz, CA (US); Ed Cahill, Cullenagh (IE)

(73) Assignee: Snap-On Incorporated, Pleasant Prairie, WI (US)

( * ) Notice: Subject to any disclaimer, the term of this patent is extended or adjusted under 35 U.S.C. 154(b) by 1650 days.

(21) Appl. No.: 11/113,214

(22) Filed: Apr. 22, 2005

(65) Prior Publication Data
US 2006/0241830 A1    Oct. 26, 2006

(51) Int. Cl.
*H05K 5/00* (2006.01)
(52) U.S. Cl. .................. 361/752; 361/800; 361/810
(58) Field of Classification Search .......... 361/752, 361/730, 790, 797, 800, 807, 810
See application file for complete search history.

(56) References Cited
U.S. PATENT DOCUMENTS

| | | | |
|---|---|---|---|
| 5,891,051 A * | 4/1999 | Han et al. ............... 600/573 |
| 5,927,676 A * | 7/1999 | Lefton ..................... 248/472 |
| 6,016,248 A * | 1/2000 | Anzai et al. ............ 361/679.59 |
| 6,515,867 B2 * | 2/2003 | Sheng-Hsiung et al. ..... 361/759 |
| 6,693,367 B1 | 2/2004 | Schmeisser et al. |
| 7,660,113 B2 * | 2/2010 | Kaneko ................. 361/679.59 |

\* cited by examiner

*Primary Examiner*—Hung S Bui
(74) *Attorney, Agent, or Firm*—McDermott Will & Emery LLP

(57) ABSTRACT

A vehicle diagnostic display unit including a case, a display screen disposed within a front portion of the case, and a main support coupled to a side of the case and having a finger compartment for receiving a user's fingers to allow the user to lift the vehicle diagnostic display unit using one hand. A navigation pad is disposed on a front surface of the main support and the main support is configured to allow a user to simultaneously lift the diagnostic display unit and access the navigation pad with a thumb. The display unit also includes a combination folding stand and hanger assembly that allows the unit to be stood up for display, or hung for display, in a hands-free manner, such that a user is free to use both hands for other purposes while still being able to view the display screen.

20 Claims, 9 Drawing Sheets

HAND-HELD DIAGNOSTIC DISPLAY UNIT INCLUDING COMBINATION FOLDING STAND AND HANGER ASSEMBLY

FIELD OF THE DISCLOSURE

The present disclosure generally relates to motor vehicle diagnostic equipment and methods and, more specifically, to a hand-held automotive diagnostic display unit including a combination folding stand and hanger assembly.

BACKGROUND OF THE DISCLOSURE

Modern vehicles include various electronic control units, such as microprocessors and controllers, that are programmed to control vehicle operations. Such control units include, for example, an Electronic Control Module (ECM) or on-board computer. The control units are designed to monitor the operation of vehicle electronics so as to optimize vehicle performance. For example, control units such as an ECM can monitor the amount of carbon monoxide in the engine exhaust and adjust the fuel/air ratio entering the cylinders in order to optimize combustion efficiency.

When multiple control units are available, they are typically interconnected so that certain key data is globally available. The data can be accessed by a user through an information port. Diagnostic systems are commonly used to obtain (and sometimes transmit) data through the information port. Accordingly, the diagnostic system can be used to monitor and adjust the operation of various systems of the vehicle, and also detect malfunctions.

Traditional diagnostic systems are provided in the form of units that are coupled to the information port by means of a data cable. The large diagnostic systems typically include a computer, a monitor, and a keyboard. Smaller, portable diagnostic systems are also now available. For example, U.S. Pat. No. 6,693,367, which is assigned to the assignee of the present application, shows a portable, hand-held vehicle diagnostic display unit that is configured such that a user can simultaneously lift and operate the diagnostic display unit with a single hand. The disclosed portable, hand-held vehicle diagnostic display unit also includes a leg that can be unfolded and used to stand the unit up for display in a hands-free manner.

What is still desired is a new and improved automotive diagnostic display unit. Preferably, the automotive diagnostic display unit will be portable and configured such that a user can simultaneously lift and operate the diagnostic display unit with a single hand. The new and improved automotive diagnostic display unit will also preferably be able to be stood up for display, or hung for display, in a hands-free manner.

SUMMARY OF THE DISCLOSURE

The present disclosure provides a vehicle diagnostic display unit including a case, a display screen disposed within a front portion of the case, and a main support coupled to a side of the case and having a finger compartment for receiving a user's finger to allow the user to lift the vehicle diagnostic display unit using one hand. A navigation pad is disposed on a front surface of the main support, and the main support is configured to allow a user to simultaneously lift the diagnostic display unit and access the navigation pad with a thumb. The display unit also includes a combination folding stand and hanger assembly that allows the unit to be stood up for display, or hung for display, in a hands-free manner, such that a user is free to use both hands for other purposes while still being able to view the display screen.

Additional aspects and advantages of the present disclosure will become readily apparent to those skilled in this art from the following detailed description, wherein only an exemplary embodiment of the present disclosure is shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF AN EXEMPLARY EMBODIMENT OF THE DISCLOSURE

Figure 1:
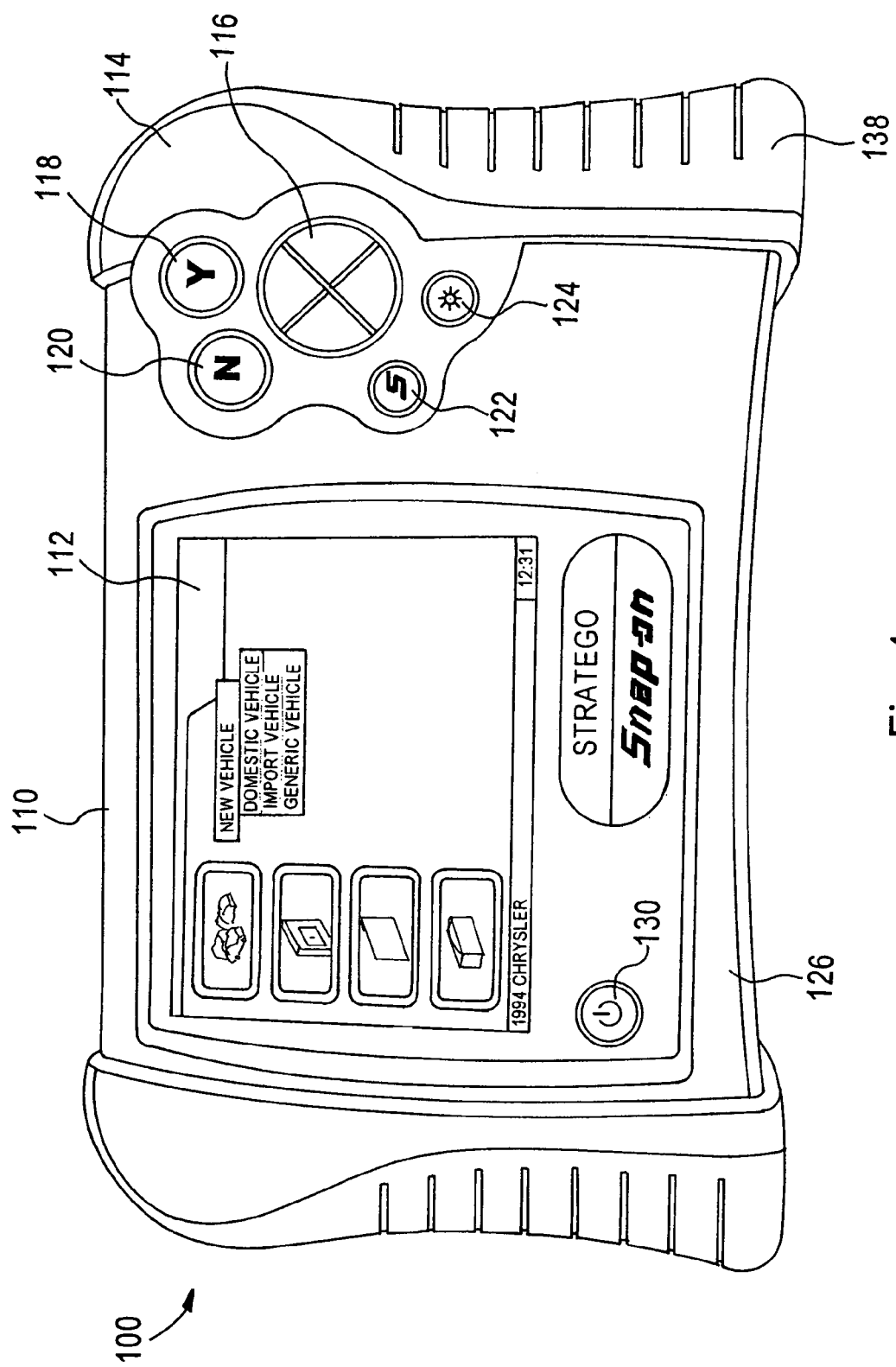
FIG. 1 is a front elevation view of an exemplary embodiment of a hand-held automotive diagnostic display unit according to the present disclosure.
Figure 2:
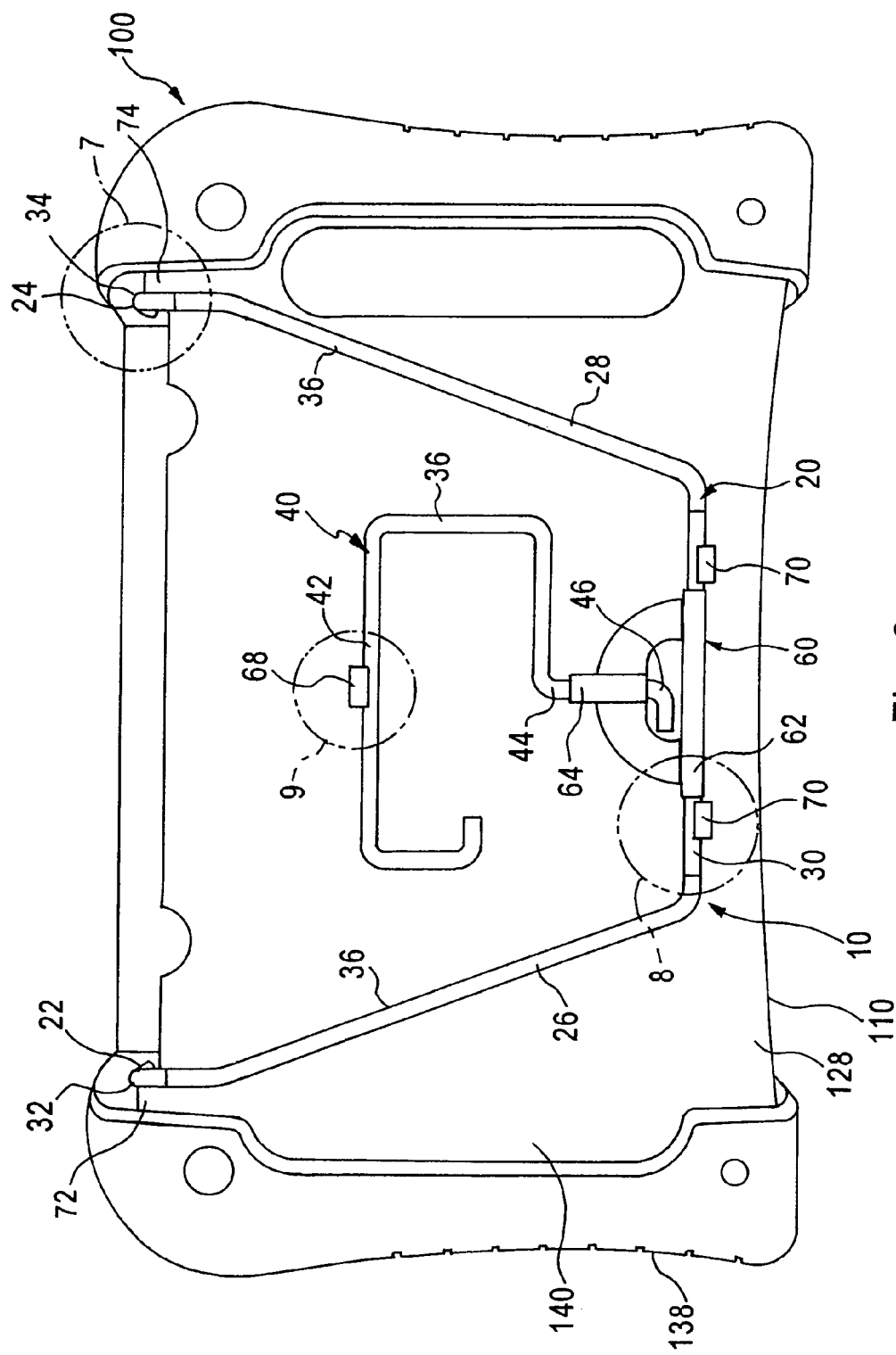
FIG. 2 is a rear elevation view of the hand-held automotive diagnostic display unit of FIG. 1, wherein an exemplary embodiment of a combination folding stand and hanger assembly constructed in accordance with the present disclosure is shown attached as part of the display unit.
Figure 3:
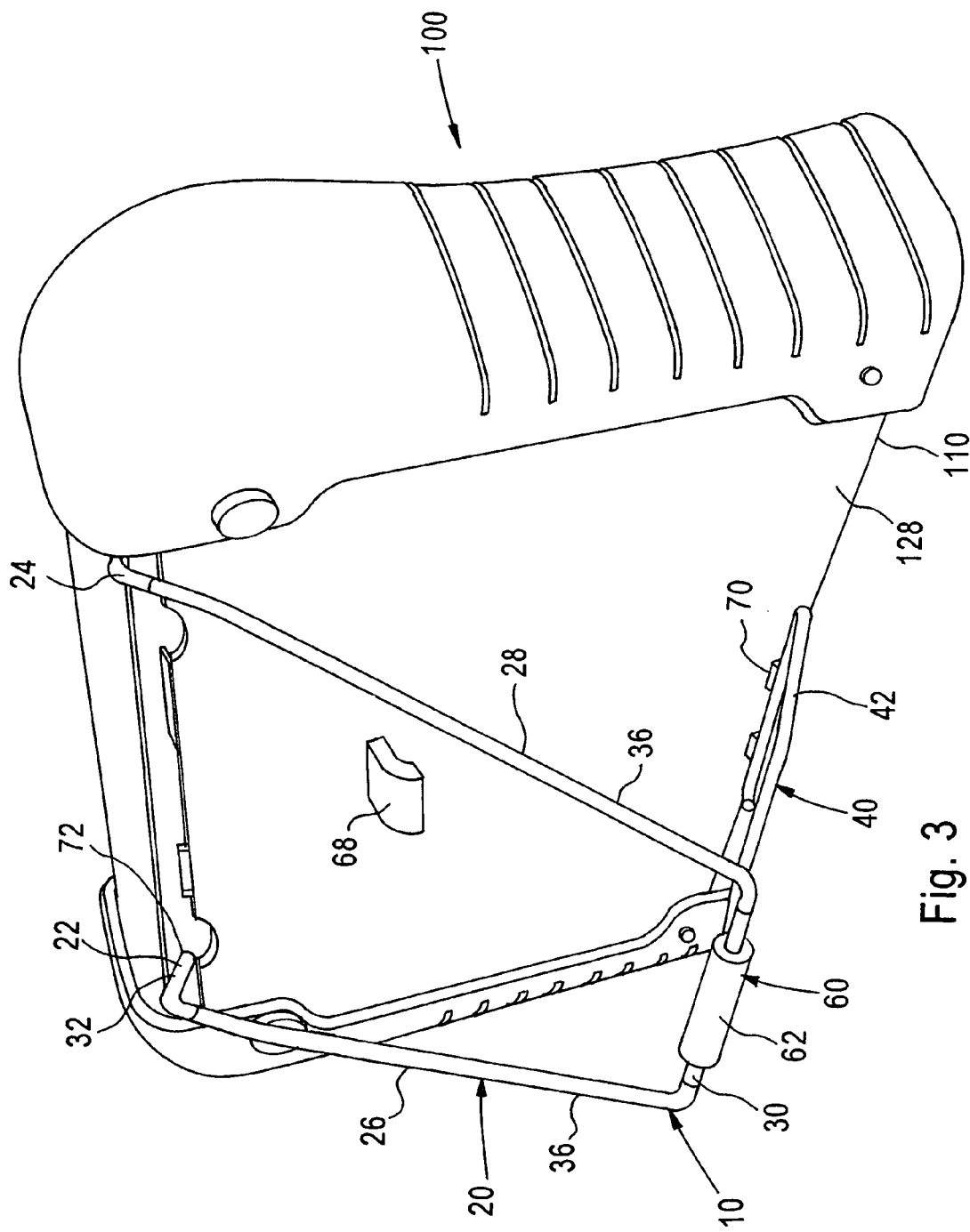
FIG. 3 is a rear perspective view of the hand-held automotive diagnostic display unit of FIG. 1, wherein the combination folding stand and hanger assembly is shown unfolded into a first unfolded position wherein the assembly is used to stand-up the display unit from below.
Figure 4:
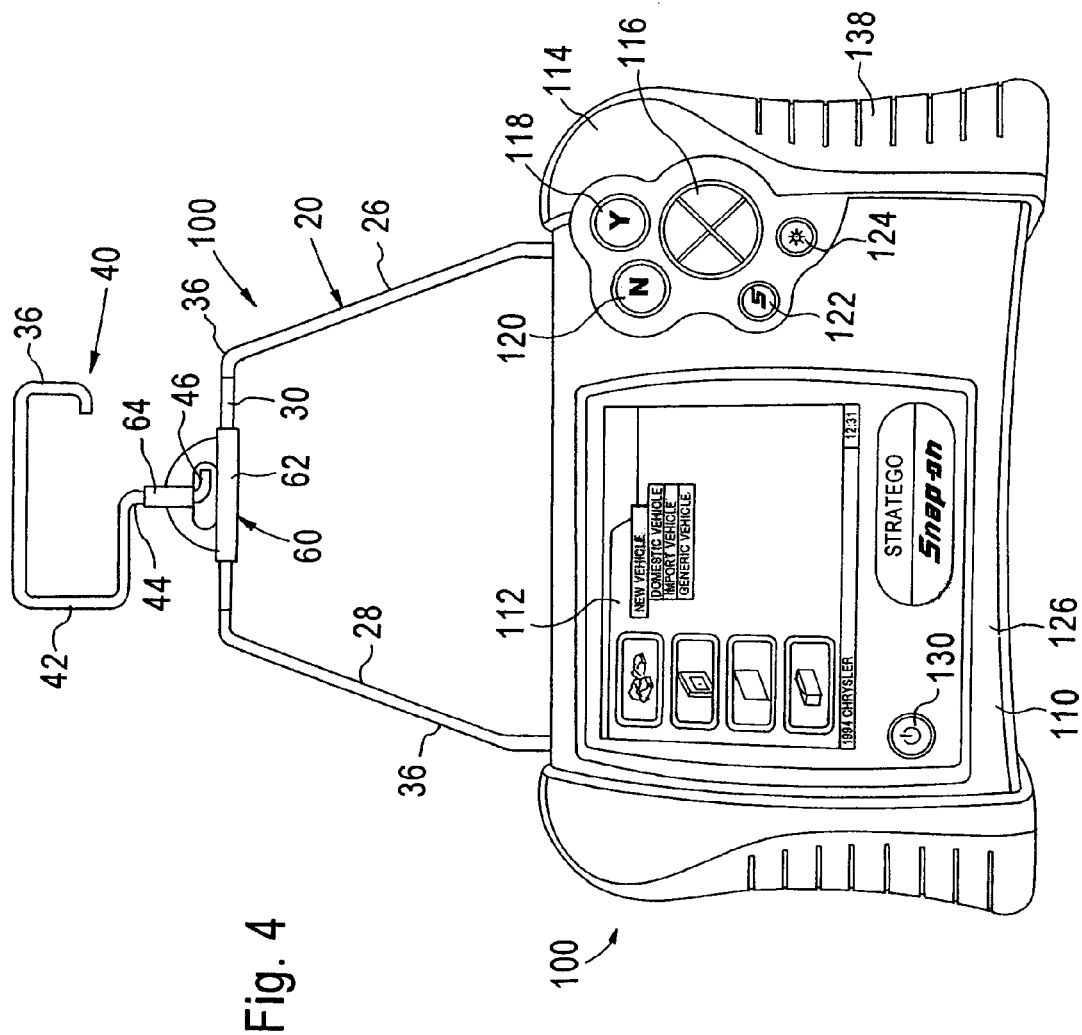
FIG. 4 is a front elevation view of the hand-held automotive diagnostic display unit of FIG. 1, wherein the combination folding stand and hanger assembly is shown unfolded into a second unfolded position wherein the assembly can be used to hang the display unit from above.
Figure 5:
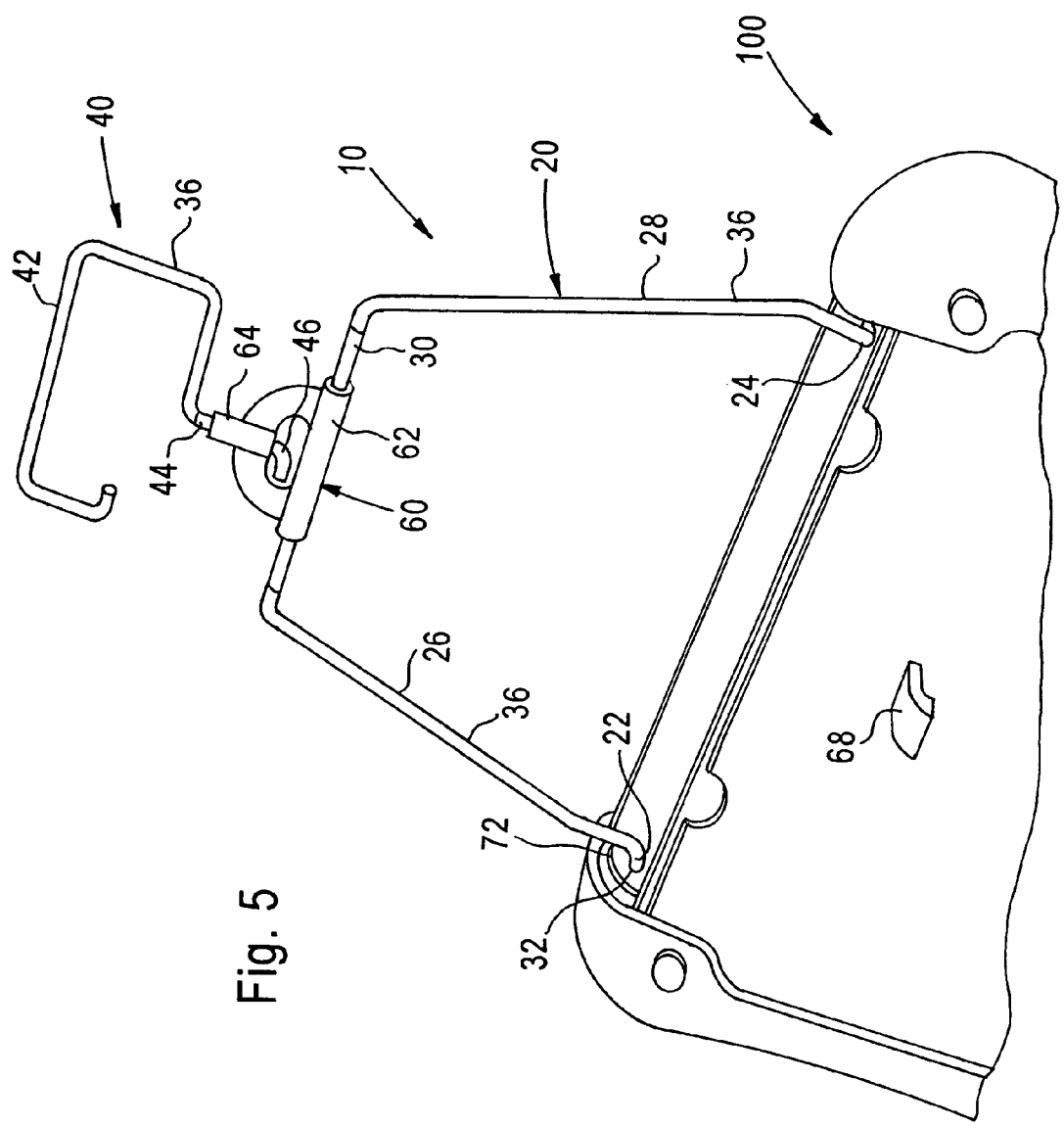
FIG. 5 is an enlarged, rear perspective view of a top portion of the hand-held automotive diagnostic display unit of FIG. 1, wherein the combination folding stand and hanger assembly is shown unfolded into the second unfolded position wherein the assembly can be used to hang the display unit from above.
Figure 6:
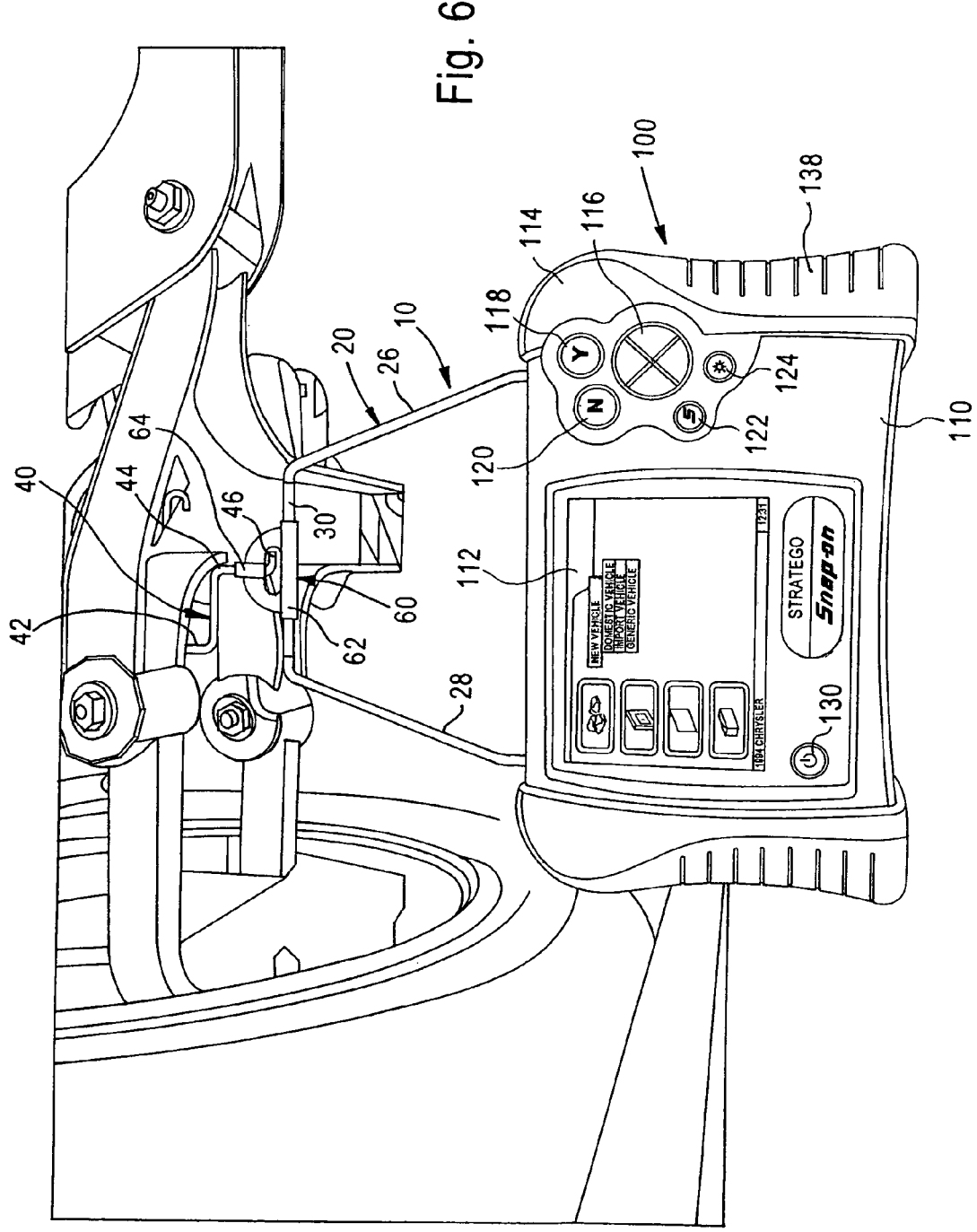
FIG. 6 is a front elevation view of the hand-held automotive diagnostic display unit of FIG. 1, wherein the combination folding stand and hanger assembly is shown unfolded into the second unfolded position and is shown, as an example, used to hang the display unit from the undercarriage of a lifted automobile.

Turning now the drawings, and initially to FIG. 1, there is shown an exemplary embodiment of a vehicle diagnostic display unit 100 constructed in accordance with the present disclosure. As shown in FIGS. 2-6, the diagnostic display unit 100 includes a combination folding stand and hanger assembly 10 constructed in accordance with the present disclosure. The combination folding stand and hanger assembly 10 allows the unit 100 to be stood up for display, or hung for display, in a hands-free manner, such that a user is free to use both hands for other purposes while still being able to view the display unit 100. In a folded position, as shown in FIG. 2, the combination folding stand and hanger assembly 10 allows the unit 100 to be laid flat. When unfolded into a first unfolded position, the assembly 10 can be used to stand-up the display unit 100 from below in a hands-free manner, as shown in FIG. 3. When unfolded into a second unfolded position, as shown in FIGS. 4-6, the assembly 10 can be used to hang the display unit 100 from above in a hands-free manner.

Referring to FIG. 1, the exemplary embodiment of the diagnostic display unit 100 includes a case 110, a display screen 112, a main support 114, and a plurality of keys 116, 118, 120, 122, 124 disposed on the main support 114. The display screen 112 is mounted within a front portion 126 of the diagnostic display unit 100 and, in the exemplary embodiment shown, the display screen 112 is in the form of a liquid crystal display (LCD) screen. It should be noted, however, that various other types of display screens 112, such thin film transistor (TFT), touch sensitive, or gas plasma, can be used in place of the illustrated LCD display screen 112. A diagnostic display unit that is, in general, similar to the present diagnostic display unit 100 is described in U.S. Pat. No. 6,693,367, which is assigned to the assignee of the present application and incorporated herein by reference.

The main support 114 is coupled to a side of the case 110 to allow a user to hold and operate the diagnostic display unit 100 using one hand. According to one exemplary embodiment, the main support 114 is ergonomically designed based on the shape and contour of the hand. Specifically, the main support 114 is contoured to comfortably fit within the palm of the user when holding the diagnostic display unit 100.

The selection keys 116, 118, 120, 122, 124 disposed on the front surface of the main support 114 are used to operate the diagnostic display unit 100. In the exemplary embodiment shown, the plurality of keys includes a navigation pad 116 and a plurality of selection keys 118, 120, 122, 124 associated with the navigation pad 116. The navigation pad 116 is in the form of directional thumb pad. By applying pressure along different portions of the navigation pad with the thumb, the user can navigate a cursor, not shown, on the display screen 112 through various menus.

The selection keys 118, 120, 122, 124 allow an operator to make various selections within the menus displayed on the display screen 112. For example, the selection keys can comprise a "yes" key 118 and a "no" key 120. In operation, for example, the user would navigate the cursor to a particular item using the navigation pad 116, and press the "yes" key 118 to accept the entry or access an additional menu. The "no" key 120 can be used, for example, to reject a selection or navigate to a previous menu screen. The diagnostic display unit 100 also includes a power key 130 that allows the user to turn the diagnostic display unit 100 on and off.

A user can advantageously hold and operate the diagnostic display unit 100 using a single hand. This allows the user to utilize their free hand to access various items, or take notes, during the diagnostic process. Additionally, such a one-handed construction allows the user to quickly view and operate the diagnostic display unit 100 while, for example, working under the hood of the vehicle.

With continued reference to FIGS. 1-6, the main support 114 of the exemplary embodiment also includes a palm rest 138 formed thereon, and a finger cavity or compartment 140 formed on the rear surface thereof. The finger cavity or compartment 140 extends a prescribed distance into the main support 114 to further improve the user's ability to grip the main support 114. Specifically, when the user grabs the main support 114, the palm rest 138 is designed to comfortably fit into the palm of the user, while the fingers are wrapped around the main support 114 and extended into the finger cavity or compartment 140. Accordingly, a tight and secure grip can be achieved, while the user is still able to move his or her thumb freely for operation of the thumbpad 116 and the selection keys 118, 120, 122, 124.

Although not shown, the diagnostic display unit 100 of the present disclosure may include at least one power supply compartment, e.g., battery compartment containing rechargeable batteries, to allow cordless operation. The display unit 100 may also include various connectors, such as a high density d-type connector for receiving a cable (not shown) that can be coupled to a vehicle's ECM or on-board computer. The diagnostic display unit 100 may further include a charging circuit that functions to supply a charge to the rechargeable batteries when the diagnostic display unit 100 is electrically coupled to the vehicle. Secondary connectors may be provided for exchanging data and various signals with external components or vehicle components other than the on-board computer and may include a RS-232 port, a universal serial bus (USB) port, an Ethernet port, and a power supply connection for connecting the diagnostic display unit 100 to an external power source. Although not shown, the diagnostic display unit 100 can also include at least one expansion slot provided within the case 110 for upgrading or improving various features of the diagnostic display unit 100. Such features can include, for example, volatile memory, non-volatile memory, a modem interface, etc. Such a feature advantageously allows the user to upgrade and improve the features of the diagnostic display unit 100, thereby extending its usable technological life. In other words, rather than replacing the diagnostic display unit 100 for a newer model, the expansion cards can be used to upgrade the features of an aging diagnostic display unit 100.

Referring to FIG. 2, the combination folding stand and hanger assembly 10 of the present disclosure includes a stand 20 and a hanger 40. In the exemplary embodiment shown, the stand 20 includes a first end 22 that is inserted into a first hinge aperture 32 disposed on a rear portion 128 of the case 110, and second end 24 that is inserted in a second hinge aperture 34 disposed on the rear portion of the case 110. The stand 20 is therefore capable of pivoting within the hinge apertures 32, 34. The pair of hinge apertures 32, 34 are oppositely disposed on the case 110. Specifically, the hinge apertures 32, 34 are provided along a common axis and separated by a predetermined distance. The stand 20 also includes a first leg 26 extending from the first end 22, a second leg 28 extending from the second end 24, and a foot 30 connecting the first and second legs.

The hanger 40 includes a hook portion 42 extending from an arm 44. A connecting member 60 secures the hanger 40 to the stand 20. In the exemplary embodiment shown, the connecting member 60 includes a first sleeve 62 received over the foot 30 of the stand 20. The first sleeve 62 is adapted for rotation on the foot 30 such that the hanger 40 can be rotated about the foot. The connecting member 60 also includes a second sleeve 64 received over the arm 44 of the hanger 40. The second sleeve 64 is adapted to allow rotation of the arm 44, such that the hanger 40 can be rotated about an axis of the arm 44. A free end 46 of the arm 44 is curled to prevent the arm 44 from being axially pulled out of the second sleeve 64.

As will be appreciated by those skilled in the art, the stand 20 and the hanger 40 must have sufficient strength for supporting the diagnostic display unit 100, and must therefore be constructed from appropriate materials. According to one exemplary embodiment, the stand 20 and the hanger 40 are formed from a metal wire. Portions of the stand 20 and the hanger 40 may also be coated with a layer of vinyl 36, as shown.

Figure 8:
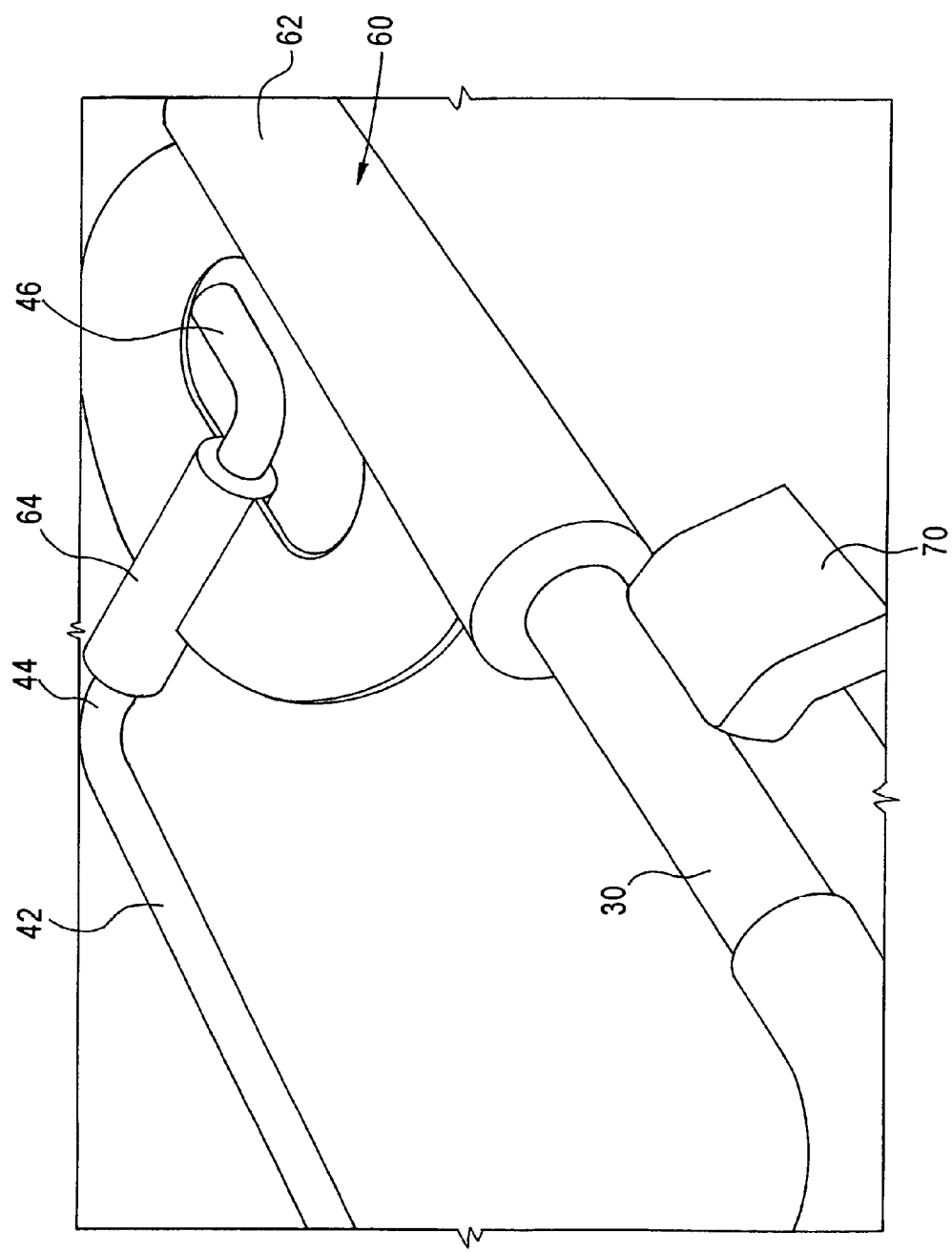
FIG. 8 is an enlarged perspective view of a portion of the hand-held automotive diagnostic display unit contained within the circled "8" of FIG. 2, wherein a latch for receiving the combination folding stand and hanger assembly is shown.
Figure 9:
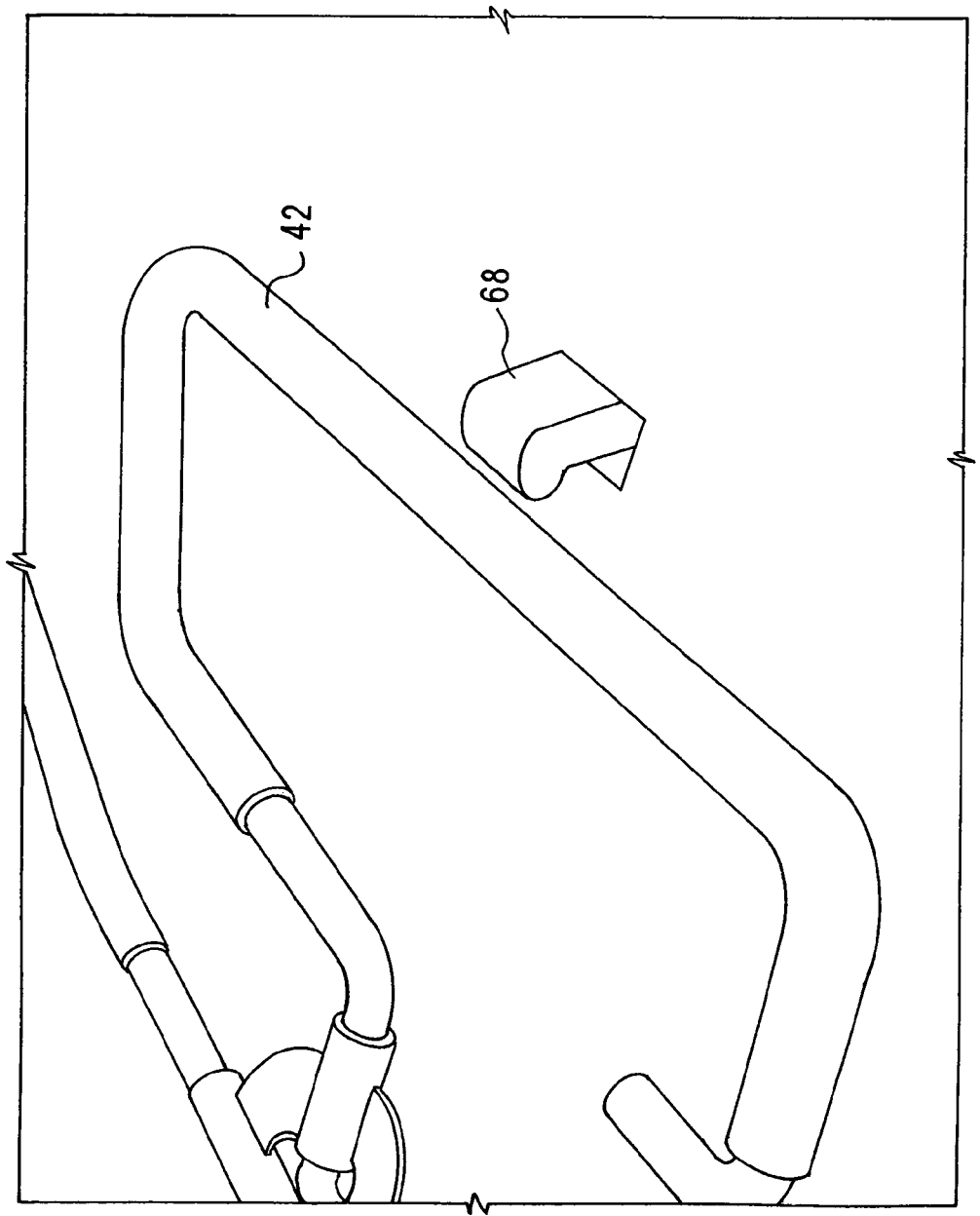
FIG. 9 is an enlarged perspective view of a portion of the hand-held automotive diagnostic display unit contained within the circled "9" of FIG. 2, wherein another latch for receiving the combination folding stand and hanger assembly is shown.

A locking clip 68 is provided on the rear portion of the case 110 to securely retain the hook portion 42 when the assembly 10 is in the folded position, as shown in FIG. 2. FIG. 9 shows the clip 68 in greater detail. Locking clips 70 are also provided on the rear portion of the case 110 to securely retain the foot 30 of the stand 20 when the assembly 10 is in the folded position, as shown in FIG. 2. FIG. 8 shows one of the clips 70 in greater detail. While in the folded position, the combination folding stand and hanger assembly 10 allows the unit 100 to be laid flat.

When unfolded into the first unfolded position, the hook portion 42 is pulled out of the locking clip 68, the foot 30 of the stand 20 is pulled out of the locking clips 70, and the stand 20 is pivoted within the hinge apertures 32, 34. In the first unfolded position, the assembly 10 can be used to stand-up the display unit 100 from below in a hands-free manner, as shown in FIG. 3. The assembly 10 supports the display unit 100 in a reclined position at an angle of about 40 to 50 degrees from horizontal.

Figure 7:
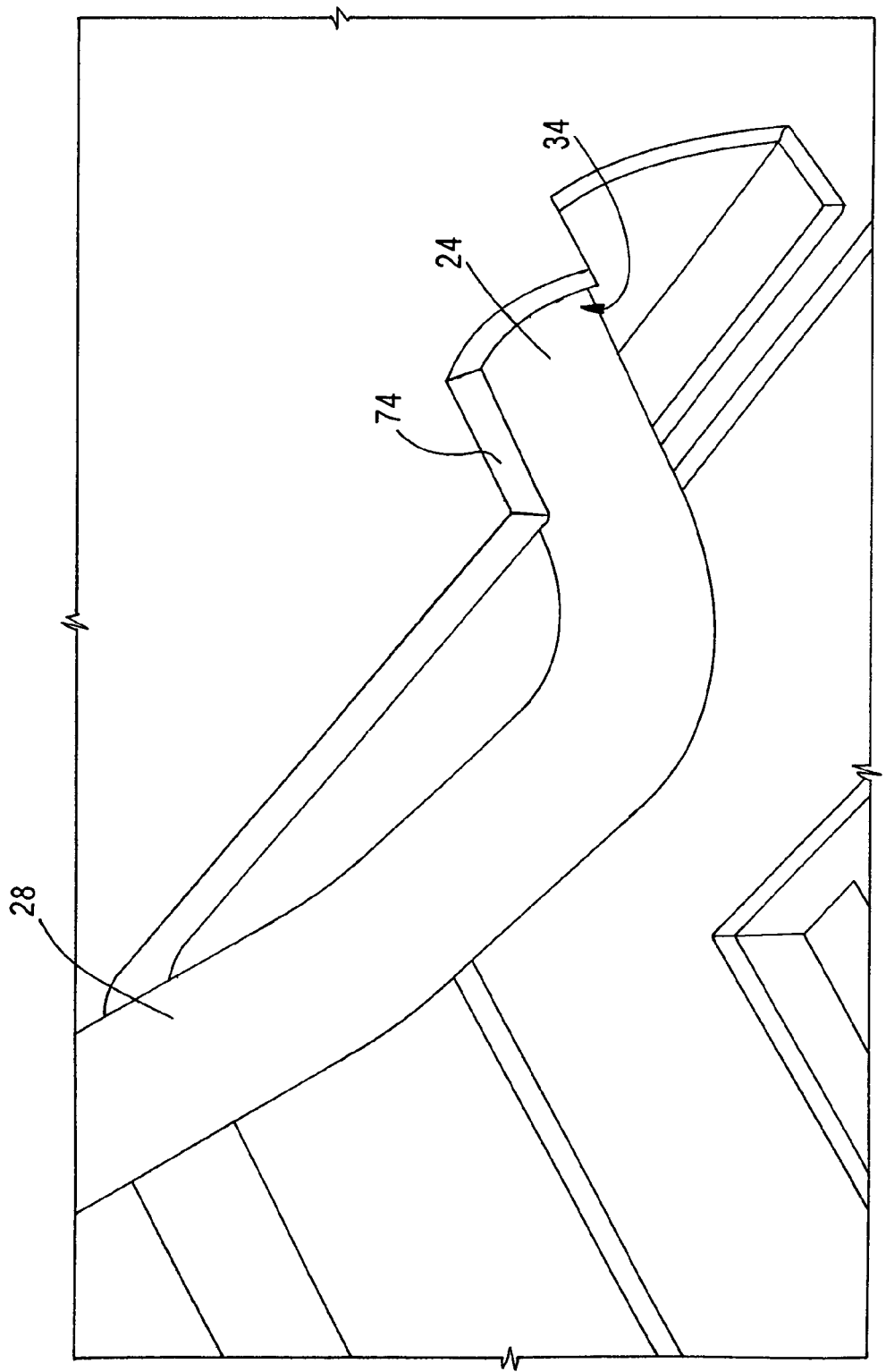
FIG. 7 is an enlarged perspective view of a portion of the hand-held automotive diagnostic display unit contained within the circled "7" of FIG. 2, wherein an end of the combination folding stand and hanger assembly and a stop formed in a body of the display unit are shown.

Stops 72, 74 may be provided just outside of the hinge apertures 32, 34 to limit an amount the stand 20 can be pivoted within the hinge apertures 32, 34, such that the legs 26, 28 contact the stops 72, 74 when the stand 20 is pivoted into the first unfolded position. In order to rotate the stand 20 past the stops 72, 74 to the second unfolded position, the legs 26, 28 are squeezed towards each other so that they can pass over the stops 72, 74. FIG. 7 shows one of the stops 74 in greater detail.

In the second unfolded position, shown in FIGS. 4-6, the stand 20 is rotated within the hinge apertures 32, 34 to about 180 degrees from the folded position of FIG. 2. When unfolded into the second unfolded position, the assembly 10 can be used to hang the display unit 100 from above in a hands-free manner. In particular, the hanger 40 and the connecting member 60 can be rotated on the foot 30 by about 180 degrees so that the hook portion 42 of the hanger 40 extends upwardly. In addition, the hanger 40 can be rotated about an axis of the arm 44 in order to change the position of the hook portion 42.

FIG. 6 shows the hand-held automotive diagnostic display unit 100, wherein the combination folding stand and hanger assembly 10 is shown unfolded into the second unfolded position, and is shown, as an example, used to hang the display unit 100 from the undercarriage of a lifted automobile.

The present disclosure, therefore, provides an automotive diagnostic display unit 100 including a combination folding stand and hanger assembly 10 that allows the display unit to be stood up or hung in a hands-free manner, such that a user is free to use both hands for other purposes while still being able to view a display screen 112 of the display unit 100.

The specific devices described in this specification have been presented by way of illustration rather than limitation, and various modifications, combinations and substitutions may be effected by those skilled in the art without departure either in spirit or scope from this disclosure in its broader aspects and as set forth in the appended claims. The devices disclosed herein, and all elements thereof, are contained within the scope of at least one of the following claims. No elements of the presently disclosed devices are meant to be disclaimed.

What is claimed is:

1. A vehicle diagnostic display unit comprising:
   a case;
   a display screen disposed within a front portion of the case;
   a main support coupled to the case and having a finger compartment for receiving a user's fingers to allow the user to lift the vehicle diagnostic display unit using one hand;
   a navigation pad disposed on the main support, wherein the main support is configured to allow a user to simultaneously lift the diagnostic display unit and access the navigation pad with a thumb;
   a stand extending from a back portion of the case, wherein an end of the stand is pivotally connected to the case and the stand is pivotally moveable from a folded position wherein the stand lies flat against the case, and at least one unfolded position where a foot of the stand is spaced from the back portion of the case; and
   a hanger connected to the stand and including a hook portion.

2. The vehicle diagnostic display unit according to claim 1, wherein the stand is pivotally moveable from the folded position to a first unfolded position where a foot of the stand is spaced from the back portion of the case and the stand can support the display unit in a reclined position at an angle of about 40 to 50 degrees from horizontal.

3. The vehicle diagnostic display unit according to claim 2, wherein the stand is pivotally moveable to a second unfolded position about 180 degrees from the folded position.

4. The vehicle diagnostic display unit according to claim 1, wherein the stand includes a first end received into a first hinge aperture on the rear portion of the case, and second end received in a second hinge aperture on the rear portion of the case, wherein the hinge apertures are oppositely disposed on the case and are provided along a common axis and separated by a predetermined distance.

5. The vehicle diagnostic display unit according to claim 4, wherein the stand also includes a first leg extending from the first end, a second leg extending from the second end, and the foot connects the first and second legs.

6. The vehicle diagnostic display unit according to claim 5, wherein stops are provided outside of the hinge apertures to limit an amount the stand can be pivoted within the hinge apertures, such that the legs contact the stops when the stand is pivoted into the first unfolded position, and the legs must be squeezed towards each other in order to pass over the stops and rotate the stand to the second unfolded position.

7. The vehicle diagnostic display unit according to claim 1, wherein locking clips are provided on the rear portion of the case to securely retain the foot of the stand when the stand is in the folded position.

8. The vehicle diagnostic display unit according to claim 1, wherein the hook portion of the hanger extends from an arm secured to the foot of the stand.

9. The vehicle diagnostic display unit according to claim 8, wherein a connecting member secures the hanger to the stand, and includes a first sleeve received over the foot of the stand and a second sleeve received over the arm of the hanger.

10. The vehicle diagnostic display unit according to claim 1, wherein a locking clip is provided on the rear portion of the case to securely retain the hook portion when the stand is in the folded position.

11. A display unit comprising:
a case;
a display screen disposed within a front portion of the case;
a stand extending from a back portion of the case, wherein an end of the stand is pivotally connected to the case and the stand is pivotally moveable from a folded position wherein the stand lies flat against the case, and at least one unfolded position where a foot of the stand is spaced from the back portion of the case; and
a hanger connected to the stand and including a hook portion.

12. The display unit according to claim 11, wherein the stand is pivotally moveable from the folded position to a first unfolded position where a foot of the stand is spaced from the back portion of the case and the stand can support the display unit in a reclined position at an angle of about 40 to 50 degrees from horizontal.

13. The display unit according to claim 12, wherein the stand is pivotally moveable from the first unfolded position to a second unfolded position.

14. The display unit according to claim 11, wherein the stand includes a first end received into a first hinge aperture on the rear portion of the case, and second end received in a second hinge aperture on the rear portion of the case.

15. The display unit according to claim 14, wherein the stand also includes a first leg extending from the first end, a second leg extending from the second end, and the foot connects the first and second legs.

16. The display unit according to claim 11, wherein stops limit an amount the stand can be pivoted.

17. The display unit according to claim 11, wherein locking clips are provided on the rear portion of the case to securely retain the foot of the stand when the stand is in the folded position.

18. The display unit according to claim 11, wherein the hook portion of the hanger extends from an arm secured to the foot of the stand.

19. The display unit according to claim 18, wherein a connecting member secures the hanger to the stand, and includes a first sleeve received over the foot of the stand and a second sleeve received over the arm of the hanger.

20. The display unit according to claim 11, wherein a locking clip is provided on the rear portion of the case to securely retain the hook portion when the stand is in the folded position.

* * * * *